United States Patent
Yang

(10) Patent No.: US 9,645,025 B2
(45) Date of Patent: May 9, 2017

(54) SYNCHRONOUS PRE-TENSIONABLE SENSING SCREW WITH FIBER BRAGG GRATING DEVICES

(71) Applicants: Chun-Chu Yang, Kaohsiung (TW); JINN HER ENTERPRISE CO., LTD., Kaohsiung (TW)

(72) Inventor: Chun-Chu Yang, Kaohsiung (TW)

(73) Assignees: Chun-Chu Yang, Kaohsiung (TW); Jinn Her Enterprise Co., Ltd., Kaohsiung (TW)

( * ) Notice: Subject to any disclaimer, the term of this patent is extended or adjusted under 35 U.S.C. 154(b) by 244 days.

(21) Appl. No.: 14/269,789

(22) Filed: May 5, 2014

(65) Prior Publication Data
US 2014/0373636 A1 Dec. 25, 2014

(30) Foreign Application Priority Data
Jun. 19, 2013 (TW) .............................. 102121672 A

(51) Int. Cl.
G01L 5/24 (2006.01)
G01L 1/24 (2006.01)

(52) U.S. Cl.
CPC .............. *G01L 5/24* (2013.01); *G01L 1/246* (2013.01)

(58) Field of Classification Search
CPC .................................. G01L 1/246; G01L 5/24
See application file for complete search history.

(56) References Cited

U.S. PATENT DOCUMENTS 2,824,481 A * 2/1958 Johnson ................. F16B 31/02
116/DIG. 34
2,873,341 A 2/1959 Kutsay
(Continued)

FOREIGN PATENT DOCUMENTS

KR 20110047442 A * 5/2011
KR 101060751 B1 * 8/2011

OTHER PUBLICATIONS

Pran, Karianne, Oystein Farsund, and Gunnar Wang. "Fibre Bragg grating smart bolt monitoring creep in bolted GRP composite." Optical Fiber Sensors Conference Technical Digest, 2002. Ofs 2002, 15th. IEEE, 2002.*

(Continued)

*Primary Examiner* — Lisa Caputo
*Assistant Examiner* — Punam Roy
(74) *Attorney, Agent, or Firm* — Muncy, Geissler, Olds & Lowe, P.C.

(57) ABSTRACT

An apparatus includes a sensing screw capable of providing synchronous both pre-drawing of fiber Bragg grating and pre-tightening of bolt with induced characteristics to detect feedback control of large scale public engineering structures or precise equipments to facilitate fabrication of precise elements to achieve more precise control and record fabrication processes. Through the sensing screw apparatus a precision system structure can be formed to meet expectation of improved product quality and comprehensive recording of complete production process and physical characteristics at important points of the production process. The invention can provide instant onsite status and accumulate data or make parameter pre-action to avoid error accumulation, thereby improve production yield or safety of large scale structures.

6 Claims, 6 Drawing Sheets

(56) References Cited

U.S. PATENT DOCUMENTS

| | | | | | |
|---|---|---|---|---|---|
| 3,943,819 | A | * | 3/1976 | Charron | G01L 5/24 411/14 |
| 4,904,132 | A | * | 2/1990 | Popenoe | F16B 31/025 116/DIG. 34 |
| 5,308,973 | A | * | 5/1994 | Odoni | G01L 1/243 250/227.17 |
| 5,339,696 | A | * | 8/1994 | Carignan | G01L 1/2206 73/761 |
| 5,945,665 | A | * | 8/1999 | Hay | G01B 11/18 250/227.14 |
| 6,101,884 | A | * | 8/2000 | Haake | G01B 11/16 73/800 |
| 7,628,079 | B2 | * | 12/2009 | Sato | G01L 5/24 73/761 |
| 8,262,354 | B2 | * | 9/2012 | Hoffmann | F03D 7/0224 415/118 |
| 8,433,160 | B2 | * | 4/2013 | Shah | G01D 5/35303 385/12 |
| 8,520,986 | B2 | * | 8/2013 | Dailey | 250/227.11 |
| 8,591,187 | B2 | * | 11/2013 | Bagepalli | F03D 1/0658 416/1 |
| 2007/0144267 | A1 | * | 6/2007 | Sato | G01L 5/24 73/761 |
| 2010/0329602 | A1 | * | 12/2010 | Shah | G01D 5/35303 385/13 |
| 2014/0153863 | A1 | * | 6/2014 | Sartor | G01M 11/086 385/12 |
| 2014/0306574 | A1 | * | 10/2014 | Twerdochlib | H02K 1/16 310/216.129 |
| 2015/0030408 | A1 | * | 1/2015 | Groche | B21K 25/00 411/14 |
| 2015/0198195 | A1 | * | 7/2015 | Peltz | G01N 21/952 29/407.02 |

OTHER PUBLICATIONS

Yi, Li, Chai Jing, and Qiu Biao. "A New Fiber Bragg Grating Dynamometer for Anchor and Its Application." Mining Research and Development 1 (2009): English Abstract.*

Huang, Y. H., et al. "Real-time monitoring of clamping force of a bolted joint by use of automatic digital image correlation." Optics & Laser Technology 41.4 (2009): 408-414.*

Pereira, G., et al. "On the improvement of strain measurements with FBG sensors embedded in unidirectional composites." Polymer Testing 32.1 (2013): 99-105.*

Khomenko, Anton, et al. "Clamping load monitoring in bolted joints using innovative 'MoniTorque' bolts." Proceedings of Composite and Advanced Materials Expo (CAMX 2014) Orlando (Oct. 13-16, 2014): 13-16.*

* cited by examiner

SYNCHRONOUS PRE-TENSIONABLE SENSING SCREW WITH FIBER BRAGG GRATING DEVICES

FIELD OF THE INVENTION

The present invention relates to physical characteristics sensing spots or apparatus for screw fasteners and particularly to a sensing technique implemented through a physical sensing unit or apparatus that includes a sensing screw structure with fiber Bragg grating (FBG).

BACKGROUND OF THE INVENTION

A screw, through the physical and mathematical principle of the frictional force of the inherent via increasing helical threads around the sloping outside and sloping track on its (bolt and nut) surface, can tightly fasten two or more objects with screw threads. It has been widely used for coupling and fastening since ancient time in all kinds of machineries, equipments, transportation facilities such as vehicles and engines, railway bridges, main and ancillary building structures, various types of tools and instruments, and household electric appliances and consumer electronic products, etc. A screw fastening assembly can achieve high strength connection, resist torsional rupture, resist impact loosening or fracture, resist fastening abrasion and provide repetitive use function.

A conventional screw aims to connect two or more machinery structure elements to enlarge the equipment size to make a bigger product or extend continuous production capability of the product. The conventional connecting screws mostly are used to closely fasten two mechanical structure elements without escaping a pre-design control space. The two objects fastened by a conventional screw are merely to bridge or transmit their physical characteristics, such as support gravity continuity, continuous transmission of action force and counteraction force, thermal transmission, or the like. But on expensive and important equipment, during transmission of physical characteristics at many important or critical contact points, quality and quantity changes do not generate physical data detection and signal output function. However, U.S. Pat. No. 2,873,341 entitled "Electric strain gauge and resistance" assigned to Ali Umit Kutsay et al, referring to FIG. 1, discloses a resistance sensing bolt strain gauge with an embedded screw resistance wire to sense a small change of the length of the bolt when the screw is compressed, and the small change of the length of resistance wire causes change of resistant value. Such a technique had been adopted ever since. As shown in FIG. 1, it includes a bolt 10, a central bore 11, an interval 12 one inch deep from the upper edge, two suitable cross holes 13 and 14 in the bolt, a head of the bolt 15, a core 16 made of Epoxy potting compound, a resistance wire 17, two leads 20 and 21 from two ends of the resistance wire 17, two distal ends 22 and 23 where the two leads 20 and 21 connect to the resistance wire 17, and a lead interval 24 between the leads 20 and 21. Because it uses an electronic resistance element structure to form a circuit, the signal caused by small current change due to resistance variation is easily affected by electromagnetic waves or magnetic noises generated in the test environment and distorted. As a result, the requirement of getting online signal or instant response in the present digital age is still not being met to date. For hundreds of years the screws have played an important and critical role and function in the progress of society, they have to be viewed in a new perspective and given an updated function and mission along the progress of time. This is a goal yet to be met in the screw industry.

In addition to the existing function provided by the screw in the prior art, to make further exploitation of its inherent physical data to complement its fastening function, and display and output those data and control specific functions are a commendable goal this invention aims to pursue.

SUMMARY OF THE INVENTION

Screws provide great values in physical technology despite their plain look and often being referred to as the roles by the worthy but self-deprecating people, in fact they deserve reassessment and appreciation for their functions and contributions.

To overcome the drawback of electromagnetic interference (EMI) occurred to the conventional techniques, the present invention aims to provide a fiber sensing screw embedded with a fiber Bragg grating (FBG in short hereinafter) that fasten two physical objects together. It can provide optical wavelength change induction and output through variation amount of physical characteristics. The fiber sensing screw is a general term for a screw fastener assembly embedded with a fiber Bragg grating capable of sensing physical action that includes bolts, nuts, screws or various sensing or inducing screws on different types of fasteners developed based on the present invention.

To enable the conventional screw to equip with capability of inducing and transmitting various physical characteristics, the present invention redefines a new generation of screw function and gives the screw sensing function of an active element apart from the low cost or insignificant element commonly thought in the past.

A screw fastener assembly generally consists of a bolt (or screw shank), a nut (or called female screw) and a washer (or called gasket), as shown in FIG. 2, including a bolt head 201, a nut 202, a bolt washer 203, a nut washer 204, a first coupling-intended object A marked by 205, and a second coupling-intended object B marked by 206. The screw fastener assembly aims to tightly couple the objects A and B together without separating or breaking away. When the threads of the screw fastener assembly are wrenched to reach a self-locking pretightening load force value the objects A and B are mainly coupled via the bolt head 201 with washer 203 and nut 202 with washer 204 that provide the torque force to compress the objects A and B together. The bolt has external threads to form self locking with the internal threads of the nut, and fasten the objects A and B together via the safety pretightening load force. The safety pretightening load force of the bolt can withstand the tensile force and compression force that the objects A and B are bearing within an allowable safety pretightening load range without deforming or rupturing the bolt, and the nut not loosening under vibration or loading. The pretightening load force of the bolt is generated axially on the bolt during wrenching by a tightening torque exerted between the bolt and the fasten-intended object. On the other hand, such a pretightening load force also lengthens the bolt axially and generates an axial strain. An embedded strain gauge can measure change of the strain value. Assessing the amount of the pretightening load force of a specific bolt has to take into account of the relationship between the tightening torque of the bolt, friction force between the bolt and nut, friction force between the nut and fasten-intended object, and existence of dynamic energy transmission between the nut and fasten-intended object (such as the fasten-intended object being an engine hood). The conventional tool to make precise measurement of the pretightening load force of a bolt is a resistance strain gauge. It can precisely measure force variation amount down to kilogram, and often is used to measure the pretightening load force of the bolt prior to the test of maximum airtight pressure, such as on a large scale steam boiler used in nuclear reactors or various engine containers, even on fulltime continuous online control measurement. However, the signal of small current variations caused by change of resistance on the circuit consisting of electronic resistors in the conventional techniques often is impacted and distorted by electromagnetic waves or noises of magnetic field generated in the test environment. The flaw of deficiency in capability to fend off EMI that occurs to the resistance strain gauge can be resolved by the technique of fiber sensing screw provided by the present invention.

As previously discussed, the bolt head 201 and washer 204 of the nut 202 are wrenched to compress and couple the objects A and B tightly together. The pretightening load force of the bolt aims to prevent the bolt and fasten-intended object from extending axially too much over the safety allowable extension length under the tightening torque. The safety allowable extension length of the pretightening load force in the axial direction of the bolt can be obtained via the increased strain of the bolt in the axial direction. The embedded strain gauge can measure the change of the strain.

In FIG. 2, for calculation of the safety extension length of the bolt, given n pieces of bolts to withstand rigidly a total tensile force of n×f that separates the connecting objects A and B, the tensile force f withstood by each bolt is:

$$f=(\Delta l/l)(\lambda_f/\lambda_h)E=\epsilon kE \quad (1)$$

where l is the effective duty length of the bolt, $\Delta l$ is the length deviation of the bolt after extension, E is the modulus of elasticity of the bolt material, $A_f$ is the cross section area of the bolt, $A_h$ is the force applied area on each bolt, $k=A_f/A_h$ is the ratio of the cross section area and force applied area of the bolt, $\epsilon=\Delta l/l$ is the strain value relative to the extension length of the bolt.

In the above equation the tensile force f of each bolt is related to the relative extension length $\epsilon$ of the bolt, the ratio k of the cross section area and force applied area of the bolt and the modulus of elasticity E of the bolt material. According the definition, strain is the total deformation of main body caused by an action force. The strain $\epsilon$ can be defined as a local change of the length of the bolt with the receiving force of strain coincided with the axis of the bolt shank. For a giving bolt, a separating tensile force f applied to the bolt is proportional to the extension length $\epsilon$. The relative extension length of the bolt, i.e. $\epsilon=\Delta l/l$ and pretightening load force $Q_0$ are in a relationship as follow:

$$Q_0=(\Delta l/l)EA_s \quad (2)$$

Where l is the force receiving length of the bolt, $\Delta l$ is the extended length of the bolt after deformation (mm), E is the modulus of elasticity (MPa), $A_s$ is the flat cross section area of the bolt (mm$^2$). Hence the pretightening load force $Q_0$ of the bolt can be obtained via the relative extension length $\epsilon$ generated by dragging the coupled objects A and B.

The resistance sensing screw strain gauge mainly adopts a principle of: when objects coupled by a nut are dragged and extended within the elasticity limit of the bolt (i.e. the shank) without causing rupture or permanent deformation of the connecting shank, in the process of restoring the deformation of the extension or shortening the resistance also increases or decreases that can be registered. The invention differs from the conventional measurement techniques mainly in: (1) replaces the resistance with FBG, and also replaces copper wires with optical fibers; (2) replaces current variations caused by changes of resistance with optical wavelength variations; and (3) replace current variations caused by the resistance due to change of wire diameter resulted from deformation of the bolt upon receiving a force with reflective wavelength variations of the FBG fiber caused by extension or shrinking deformation of the bolt upon receiving the force. The present invention aims to provide a fiber sensing screw structure with an FBG embedded in the bolt, with a longitudinal section view shown in FIG. 3. A fiber 301 includes an FBG, a bolt 302 with an axial through hole, a fiber pre-drawing and setting point on the bolt head end 303, a fiber pre-drawing and setting point on the bolt tail end 304, a period length $\Lambda$ of the fiber Bragg grating marked by 305, a fiber Bragg grating core 306, a fiber Bragg grating cladding 307, a fiber Bragg grating outer jacketing 308 and a fiber chuck 309. The working principle of fiber sensing screw through the FBG to sense relative strain amount caused by increasing or decreasing length of the bolt according to the invention is as follow:

FBG is a fiber Bragg grating sensor to make exposure on a fiber through a coherent laser to produce permanent change of refractive-index on a projected section that has bright and dark periodic strips at an interval $\Lambda$, that becomes a fiber Bragg grating, or called fiber Bragg grating (FBG). It uses a feedback function generated by Bragg diffraction to satisfy a specific wavelength of Bragg condition to reflect a feedback wavelength $\lambda_B$ opposite to the incident direction. The wavelength $\lambda_B$ is called Bragg wavelength, and can be represented by the following equation:

$$\lambda_B=2n\Lambda \quad (3)$$

Where $\Lambda$ is the periodic length of the Bragg grating, and n is the effective refractive index of the fiber. When the fiber Bragg grating is subjected to an external force and generates a strain, the original interval $\Lambda$ has a change value of $\Delta\Lambda$, put that into the equation (3) above, it becomes as follow:

$$\Delta\lambda_B=2n\Delta\Lambda \quad (4)$$

According to the definition of the strain, and set l as the length of the object receiving the force, $\Delta l$ is the induced changed length after receiving the force, $$\epsilon=\Delta l/l=\Delta\Lambda/\Lambda \quad (5)$$

then $$\Delta l=(\Delta\Lambda/\Lambda)l=(\Delta\lambda_B/2n)/(\lambda_B/2n)l$$

Hence $$\epsilon=\Delta l/l=\Delta\lambda_B/\lambda_B \quad (6)$$

As a result, applying a force on a fiber at the length of l a small length variation is generated due to the changed strain length $\Delta l$, the change amount of the reflected Bragg wavelength $\lambda_B$ is $\Delta\lambda_B$. Upon light source end, it receives a reflective feedback wavelength of $\lambda_B$ with a wavelength shifted amount of $\Delta\lambda_B$. On the other hand, if a force is applied to the fiber sensing screw assembly and a wavelength shifted amount $\Delta\lambda_B$ is received, it means that the bolt has been extended or compressed for a variation length of $\Delta l$. By measuring whether s has exceeded the limit a breaking alert signal can be issued. However, the physical characteristics of FBG are affected by temperature variations and the wavelength shifted amount $\Delta\lambda_B$ also is affected. Hence when using the FBG for a sensing device the temperature variations often are taken by the sensing device as a reference value to make temperature compensation for precision correction; or employs a chirped fiber grating (CFG) structure in the fiber grating embedded in the bolt with a long wavelength and a short wavelength to compensate wavelengths dispersion effect to overcome the inaccuracy of a single sensing element without being affected by the temperature. In FIG. 3, the FBG 301 can be changed to a CFG at the sensing head of the bolt.

A fiber sensing screw with an embedded FBG becomes the sensing screw apparatus of the invention because of the built-in FBG. It is an important optoelectronic element in wave guide optics, and can be included in a wide variety of combinations in applications of fiber communication, measurement of physical data in instrument control, connecting strain and temperature and the like. Such a sensing element also can be readily used as a fundamental intelligent cell element in research and fabrication of intelligent devices and applications. It has advantages of smaller size and lighter weight, stronger material strength, greater geometric flexibility, smaller loss of optical transmission function, high speed transmission and wider bandwidth, and also can withstand high temperature and resist EMI, and can be continuously used in harsh environments such as a high radiation working condition to provide greater stability and durability. It also can be connected to multi-point in series at the same time via a single fiber to measure physical strain and provide great advantages of precise differentiation and simpler structure. Compared with the complexity of the conventional resistance strain gauge that needs a bunch of wires to do multi-point measurement the present invention provides a novel technique with significant improvements.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Embodiment

Figure 1:
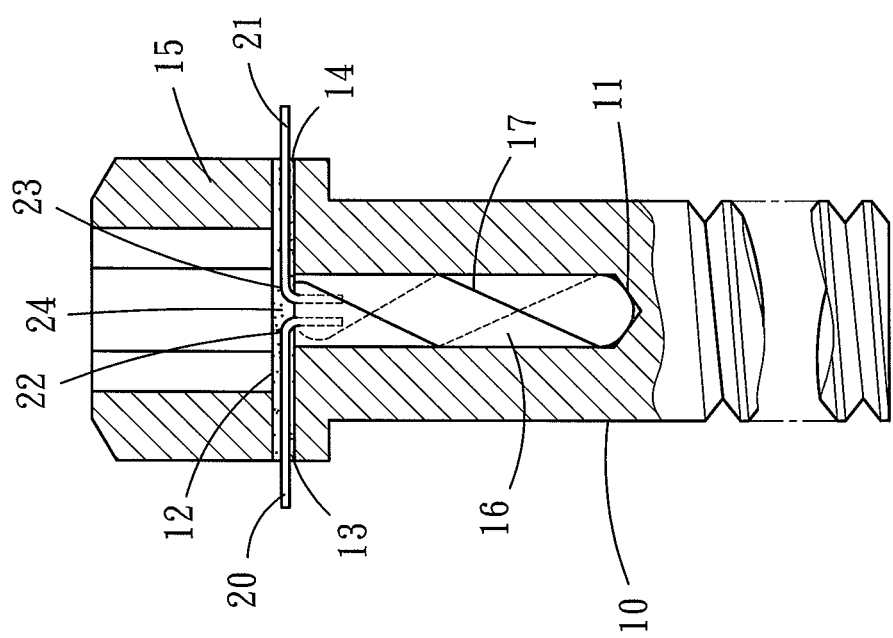
FIG. 1 is a schematic view of a prior resistance sensing bolt disclosed in U.S. Pat. No. 2,873,341.
Figure 2:
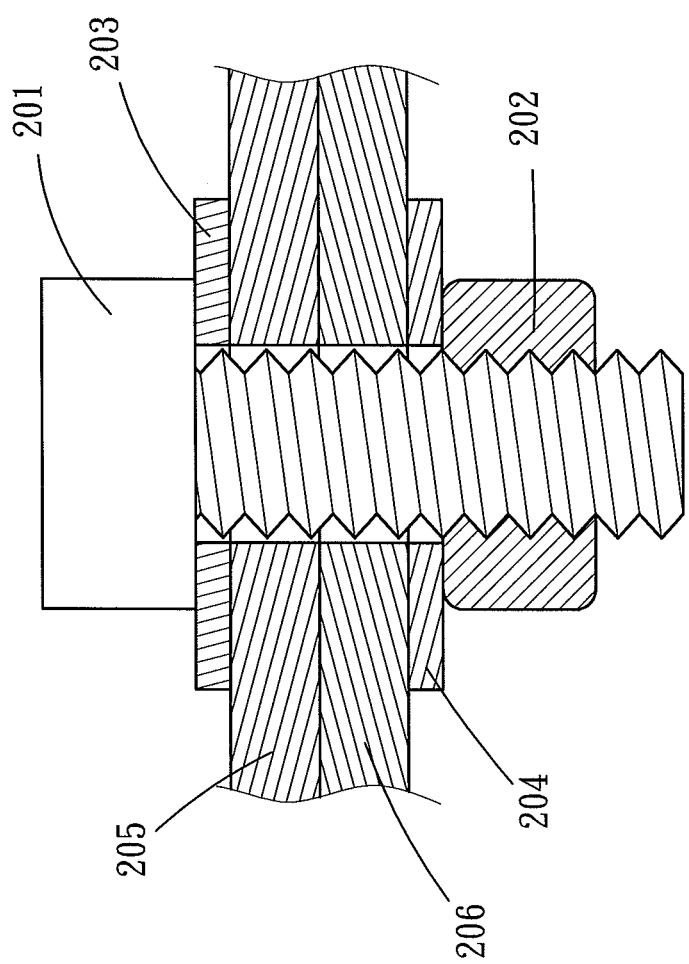
FIG. 2 is a sectional of a screw fastener assembly.
Figure 3:
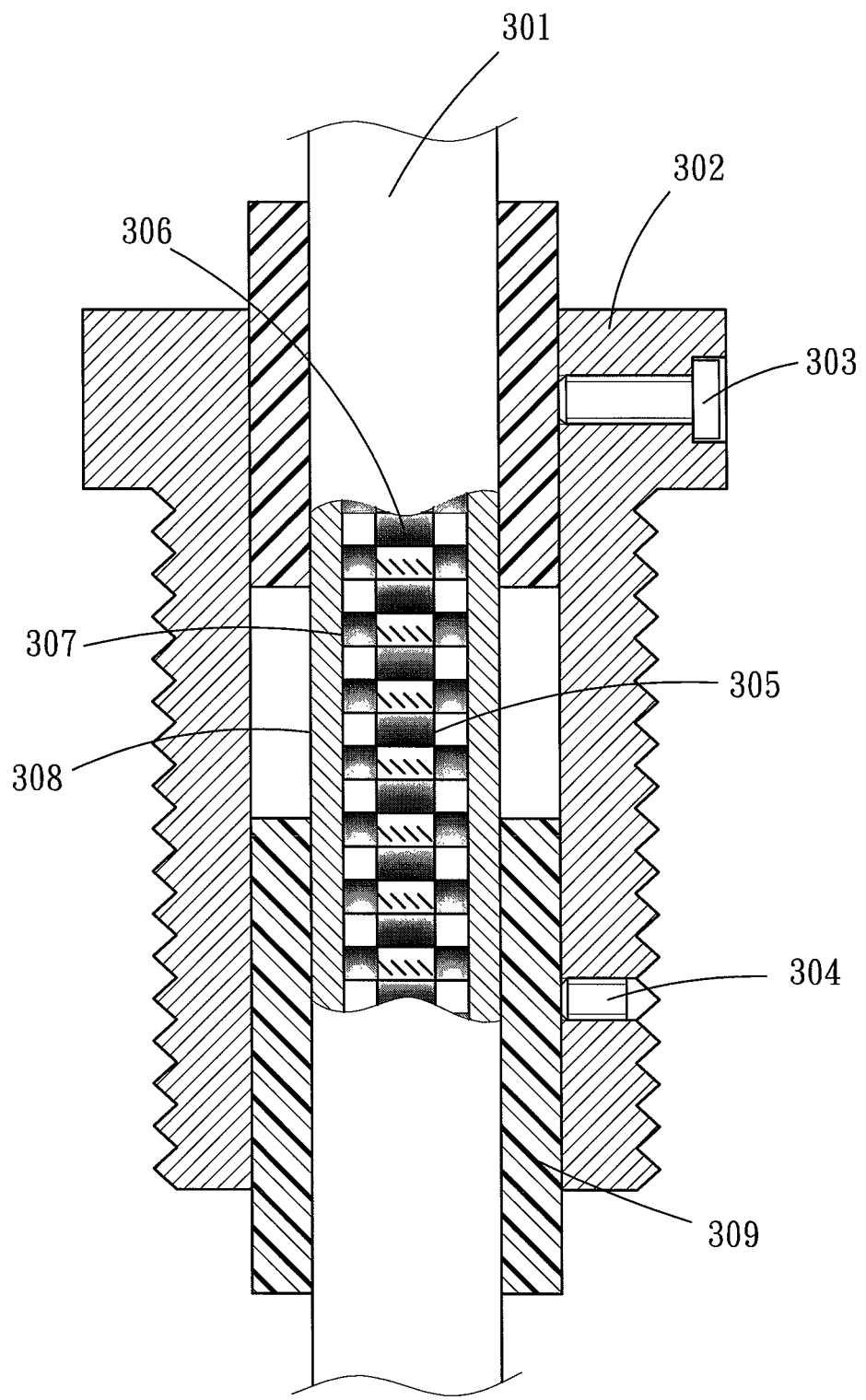
FIG. 3 is a sectional view of a fiber Bragg grating sensing bolt with an embedded FBG.
Figure 4:
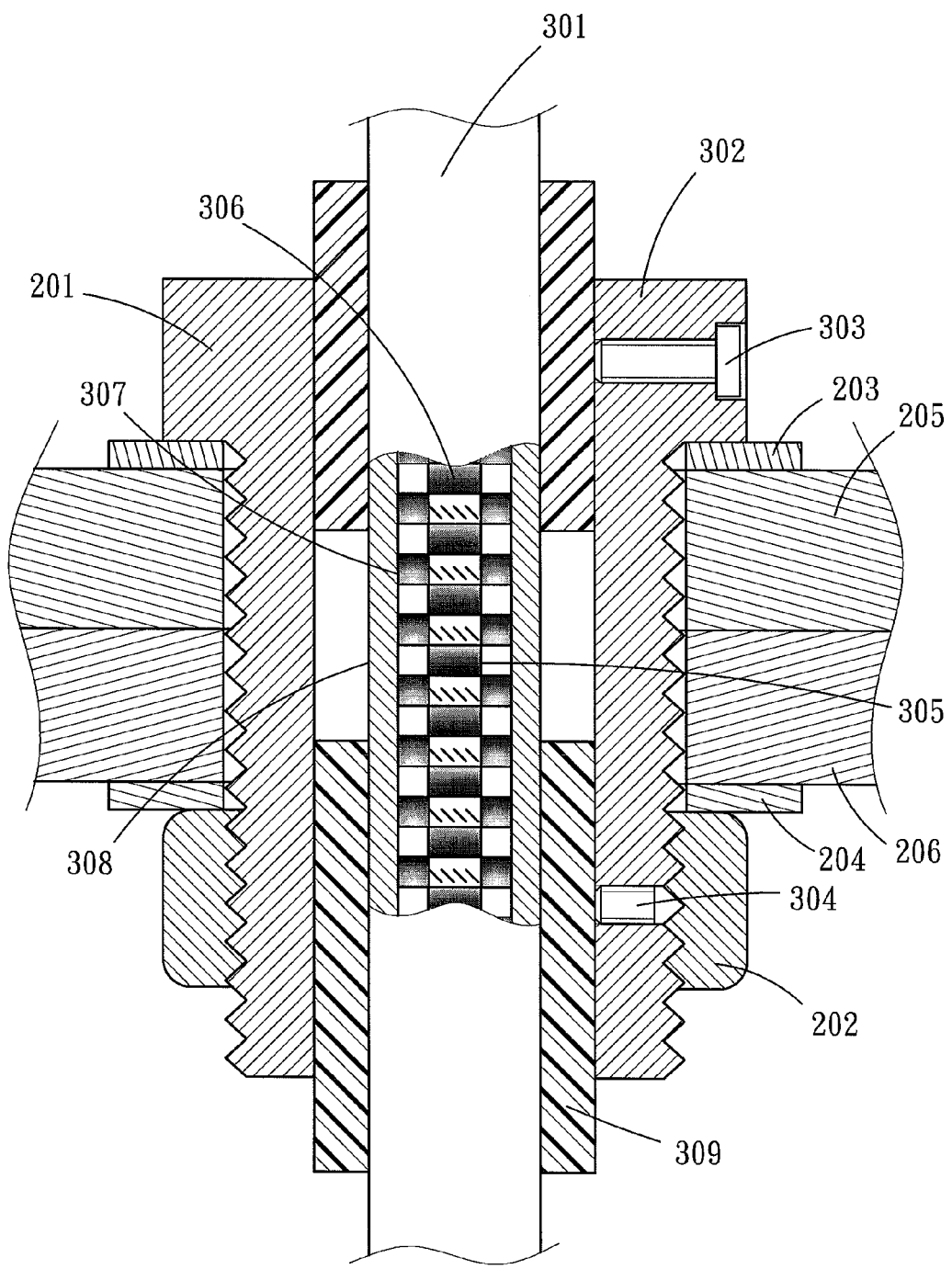
FIG. 4 is a sectional view of a screw sensing sensor assembly with an embedded fiber Bragg grating strain gauge.

Sensing Sensor of a Sensing Screw Strain Gauge Capable of Synchronously Pre-Tensionable Fiber Bragg Grating and Bolt On bridges, skyscrapers, Ferris wheels, high speed railways, large scale civil public engineering equipments, ships and aircrafts that have to extend the main body or connect objects between the structures, aside from welding for connection, fastening by screw sets are commonly used. FIG. 3 illustrates a fiber Bragg grating sensing bolt that replaces a bolt 201 of a screw fastening assembly shown in FIG. 2 to become a screw sensing sensor of a fiber Bragg grating strain gauge. Also referring to FIG. 4, it can be specially made to precisely measure strain of screw fasteners formed in various specifications, functions and shapes. The embodiment shown in FIG. 4 includes a bolt 201, a nut 202, a bolt washer 203, a nut washer 204, a first coupling-intended object A marked by 205, and a second coupling-intended object B marked by 206. A fiber also includes a fiber Bragg grating (FBG) 301, a bolt 302 with an axial through hole, a fiber pre-drawing and setting point on the bolt head end 303, a fiber pre-drawing and setting point on the bolt tail end 304, a period length $\Lambda$ of the fiber Bragg grating, a fiber Bragg grating core 306, a fiber Bragg grating cladding 307, a fiber Bragg grating outer jacketing 308 and a fiber chuck 309. The sensing sensor of the fiber Bragg grating strain gauge is tightly coupled in a complete set to be used in engineering projects and equipments that require coupled fastening of a bolt and a nut, and can perform pre-simulation test or onsite measurement to get standard construction data or onsite analysis.

Because using a screw element as the sensing sensor is the optimal method to take samples at any location where fastening is done via screw coupling, by merely capturing the intended sensing points or physically detected characteristics, sensing can be made via concentration approach, distributed and multi-point coupled in series approach or a single point approach. In the conventional technique in which sampling and detection of physical characteristic variations at a certain location via the FBG, in order for the FBG to get the optimal strain reaction of the upper limit and lower limit of wavelength at the linear measurement center, it has to be pre-drawn to the optimal working wavelength then glued it to the surface of the measurement-intended object. But to avoid the surface structure of the measurement-intended object being damaged by piercing that might impact the actual strain at the measuring point, the glued surface is not closely formed and getting the correct data is difficult. By embedding the FBG fiber in the screw to form a fiber sensing screw, not only damaging of the surface structure of the measurement-intended object can be averted, an entry right location of connecting spot to get optimal sampling of the physical characteristics of the measurement-intended object also can be selected to get the correct data. More important, the operation of pre-drawing the FBG to make optimal measurement of the fiber Bragg grating central wavelength $\lambda_B$ and the wrenching operation of the sensing head of the sensing screw to reach the pretightening load force can be accomplished at the same time via closely watching and control, and a sensing screw strain gauge or sensing head strain gauge can be synchronously formed and to be named the synchronous pre-tensionable fiber Bragg grating and bolt.

On wrenching operation of bolts on large scale engineering steel structures mentioned above fast fastening operation of each safety coupling can use the sensing screw with this synchronous pre-tensionable fiber Bragg grating and bolt, and serve as a strain sensing head before construction, during construction or after construction, or even reserve as a permanent monitor sensing point.

Figure 5A:
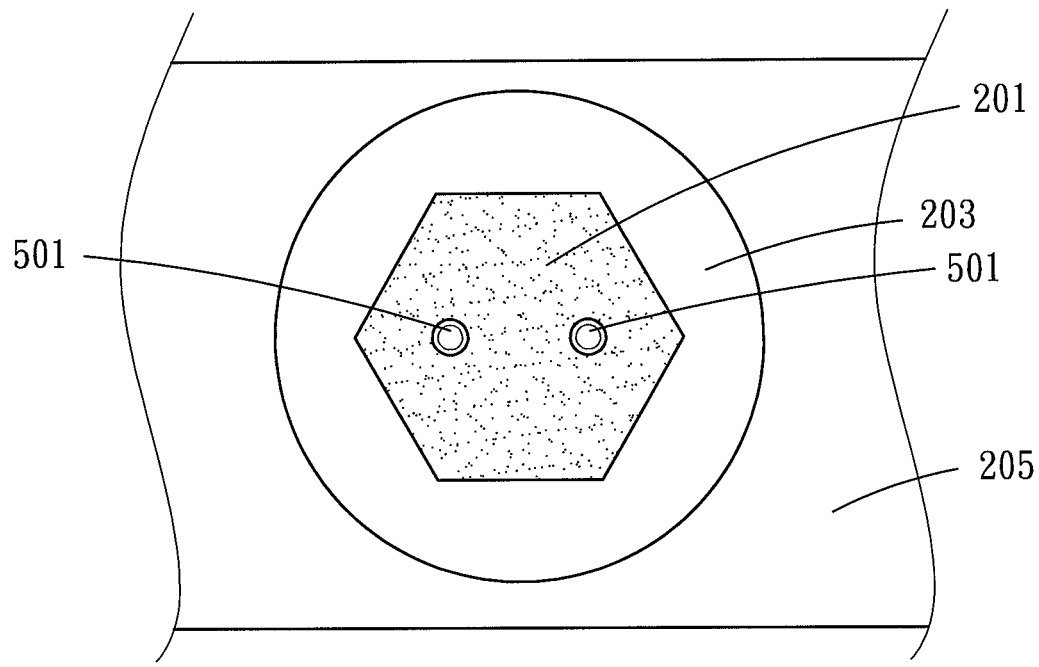
FIG. 5A is a top view of a dual-fiber Bragg grating screw sensing head.
Figure 5B:
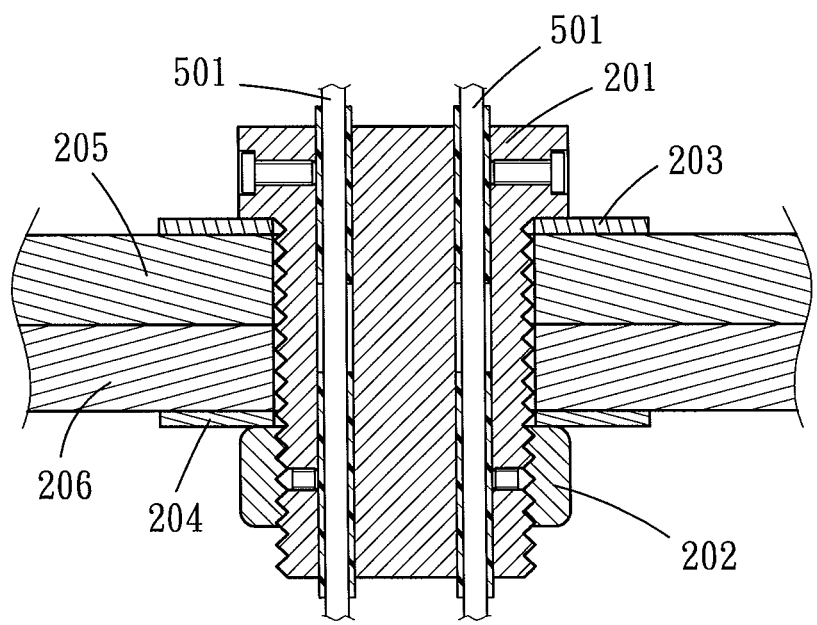
FIG. 5B is a sectional view of a dual-fiber Bragg grating screw sensing head.
Figure 6:
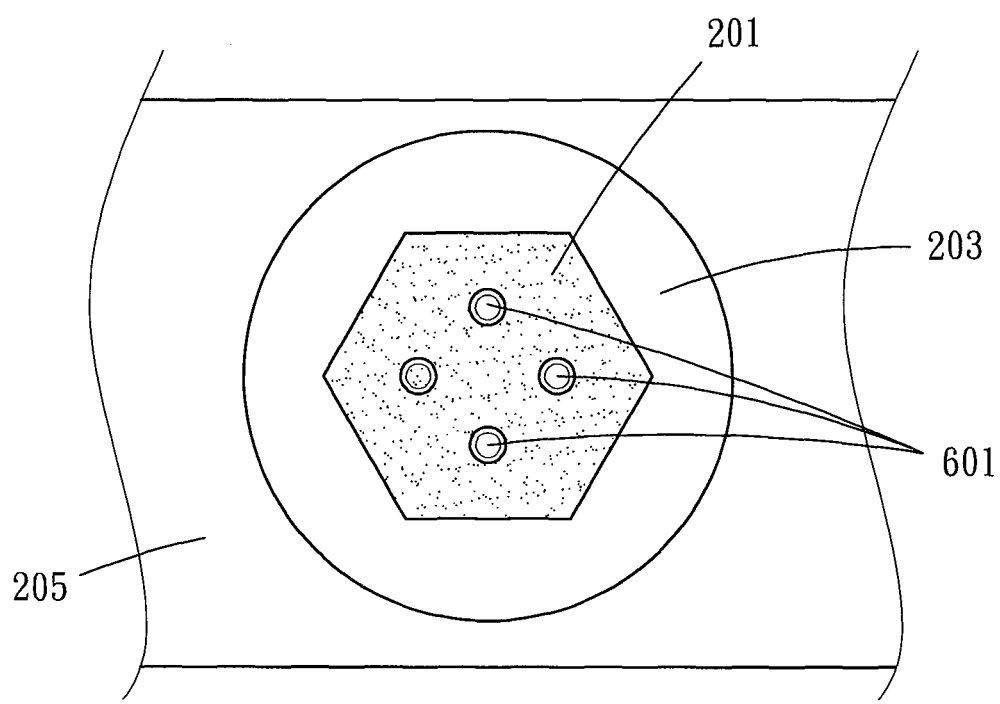
FIG. 6 is a top view of a screw sensing head with four vertically crossed fiber Bragg gratings.

The relationship of synchronously generated bolt extended amount and pretightening load force between the synchronous pre-tensionable fiber Bragg grating and bolt is shown by equation (2) below:

$$Q_0 = (\Delta l/l) E A_s \qquad (2)$$

Where l is the force receiving length of the bolt, Δl is the extended length of the bolt after deformation (mm), E is the modulus of elasticity (MPa), $A_s$ is the flat cross section area of the bolt (mm²). In the elastic zone, Δl is proportional to the relative angle θ of turning and wrenching the bolt and nut, hence $Q_0$ is the function of θ. Therefore if the wrenching angle of the nut is controlled precisely, the pretightening load force can be accurately controlled. After adding the sensing screw element of the invention, during wrenching the strain caused by the fiber Bragg grating receiving the force due to extension of the length of the bolt, that in turn causes a small change of length of ΔΛ of the original interval Λ, and the reflected Bragg wavelength $\lambda_B$ produces a variation of $\Delta\lambda_B$, upon inspection of the control end having received the wavelength shifted amount signal $\Delta\lambda_B$ of $\lambda_B$, whether the pretightening load force has met the system preset value can be judged immediately. In the event that the pretightening load force is reached, but the FBG pre-drawing force not yet reaches or exceeds the optimal central wavelength of the Bragg grating, i.e. $\lambda_B$, a more suitable bolt shank diameter or bolt stiffness can be chosen based on the average cross section area of the bolt as shown in the aforesaid equation to get the pretightening load force and pre-drawing force of the fiber at the same time. The bolt with the embedded fiber Bragg grating can employ a high tension Torque Control (T.C.) bolt or low tension bolt and make adjustment as desired. Of course getting the pretightening load force and fiber pre-drawing force at the same time during construction of the fastening assembly is the optimal choice; however, achieving by stages or setting a fine-tuning means respectively at a fiber pre-drawing and setting point 303 of the bolt head portion and another fiber pre-drawing and setting point 304 of the bolt tail portion as shown in FIG. 3 also can be adopted; or making a fine-tuning means in various shapes in an axial hole run through the cylindrical bolt to hold the FBG fiber grating at the fiber pre-drawing and setting point of the bolt head portion and at another fiber pre-drawing and setting point of the bolt tail portion also can be adopted. This embodiment merely takes a single bolt with one fiber Bragg grating in the center to sense the axial strain. However, one bolt can hold two pieces of FBG spaced from the axis of the bolt at a same distance and parallel with the axis of the bolt to perform sensing in the symmetrical directions to measure the strain of the sensing screw in the opposite directions resulted from straight line oscillation, then get the size of amplitude or physical data in the oscillating directions. FIGS. 5A and 5B illustrate relative positions of a dual-fiber Bragg grating screw sensing sensors. FIG. 6 shows the relative positions of four fiber Bragg gratings vertically crossed each other on a screw sensing sensors, with the four FBG equally spaced from the bolt axis in a parallel manner and crossed vertically with each other to measure the strain of the screw oscillated in various directions set for matrix vector analysis, then get the size of amplitude or physical data in the oscillating directions.

The embodiments set forth above have referred to elements marked by referenced numbers that can be deemed of same or similar functions, and are meant to facilitate discussion of the main features of the invention through simplified drawings, but do not intend to depict all the features in actual implementation, nor aim to indicate relative size or quantity, hence the drawings are not made in real proportions. They are drawn based on the fundamental principle to show mainly the structure of the fiber sensing screw fastener and its bolt structure for complete implementation of the sensing structure. They merely serve as representation of the fiber sensing screw and the bolt structure to form the fiber sensing screw fasteners, based on which equivalent functions can be provided and various application types can be adopted, such as the embodiment example previously discussed to the effect of synchronous getting the pretightening load force and fiber pre-drawing force at the same time during construction of the fastening assembly is the optimal choice; however, achieving by stages or setting a fine-tuning means respectively at the fiber pre-drawing and setting point 303 of the bolt head portion and another fiber pre-drawing and setting point 304 of the bolt tail portion as shown in FIG. 3 also can be adopted; or making a fine-tuning means in various shapes in an axial hole run through the cylindrical bolt to hold the FBG fiber Bragg grating at the fiber pre-drawing and setting point of the bolt head portion and at another fiber pre-drawing and setting point of the bolt tail portion also can be adopted. Thus the fiber sensing screw structure according to the invention can be adapted in a wide variety of applications.

As a conclusion, the sensing head of the sensing screw strain gauge with synchronous pre-tightening fiber grating and bolt according to the invention can be used on various coupling occasions that rely on fastening assemblies and various high speed constructions and other public engineering structures that need a great amount of safety monitoring after finish to accumulate historical usage information. It can be made by mass production at a lower cost, and provide greater safety and durability, and also can resist EMI and meet power-saving objective. It provides significant benefits to the welfare of human being.

For instance, a given number of the sensing sensor units of the sensing screw strain gauge with synchronous pre-tensionable fiber Bragg grating and bolt according to the invention can be arranged in an array fashion, each can output and access to form a system safety array interconnection.

What is claimed is:

1. A synchronous pre-tensionable fiber sensing screw apparatus providing synchronous both pre-drawing of fiber Bragg grating and pre-tightening of bolt to serve as a fastening apparatus equipped with a structure to sense strain characteristic values when subject to a force to display or output strain value, comprising:
    a bolt, including an embedded fiber Bragg grating;
    a first washer, coupled on a bolt head portion to bear the force applied to the bolt and a coupling object;
    a second washer, coupled on a nut to bear the force applied to the coupling object;
    the nut, coupled on the second washer and screwed helically on the bolt to form a self-locking connection;
    a fiber Bragg grating, embedded in the bolt;
    a setting point on the bolt head end for fiber pre-drawing;
    a setting point on the bolt tail end for fiber pre-drawing;
    and fiber chucks;
wherein the bolt and the nut wrench the object to be fastened via a tightening torque to make transformation of strain for sensing an extension length in the bolt caused by the axial strain of the bolt, and the bolt with the nut becomes a sensing screw structure to measure output wavelength variations resulted from change of length of the fiber Bragg grating embedded axially on the central axis of the bolt; the fastening apparatus is not only containing a nut been forced to pretightening amount in the bolt, but also containing a pre-drawing amount in the bolt with a setting point on the bolt head end for fiber pre-drawing and a setting point on the bolt tail end for fiber pre-drawing to measure shifted Bragg wavelength, the two pre-drawing amounts being synchronously formed or formed by stages.

2. The sensing screw apparatus of claim 1, wherein the sensing structure includes two fiber Bragg gratings equally spaced from the central axis of the bolt in a symmetrical manner and parallel with the axis of the bolt.

3. The sensing screw apparatus of claim 1, wherein the sensing structure includes four fiber Bragg gratings equally spaced from the central axis of the bolt in a symmetrical manner and parallel with the axis of the bolt and crossing each other in a vertical fashion.

4. The sensing screw apparatus of claim 1, wherein the fiber Bragg grating embedded in the bolt is formed in a fine-tuneable pre-drawing structure.

5. The sensing screw apparatus of claim 1, wherein the bolt containing the fiber Bragg grating is a high tension torque control bolt.

6. The sensing screw apparatus of claim 1, wherein the bolt containing the fiber Bragg grating is a tension-adjustable torque control bolt.

* * * * *